US010158738B2

(12) United States Patent
Xu et al.

(10) Patent No.: US 10,158,738 B2
(45) Date of Patent: Dec. 18, 2018

(54) OPTIMAL CODING METHOD FOR EFFICIENT MATCHING OF HIERARCHICAL CATEGORIES IN PUBLISH-SUBSCRIBE SYSTEMS

(71) Applicant: HERE Global B.V., Eindhoven (NL)

(72) Inventors: Bo Xu, Lisle, IL (US); Matei Nicolae Stroila, Chicago, IL (US)

(73) Assignee: HERE Global B.V., Eindhoven (NL)

( * ) Notice: Subject to any disclaimer, the term of this patent is extended or adjusted under 35 U.S.C. 154(b) by 453 days.

(21) Appl. No.: 14/579,017

(22) Filed: Dec. 22, 2014

(65) Prior Publication Data

US 2016/0182669 A1  Jun. 23, 2016

(51) Int. Cl.
*G06F 15/16* (2006.01)
*H04L 29/08* (2006.01)

(52) U.S. Cl.
CPC .......... *H04L 67/2828* (2013.01); *H04L 67/16* (2013.01); *H04L 67/26* (2013.01)

(58) Field of Classification Search
CPC ............................ H04L 67/2828; H04L 67/16
USPC ........................................................ 709/203
See application file for complete search history.

(56) References Cited

U.S. PATENT DOCUMENTS

| 4,122,440 | A  | * | 10/1978 | Langdon, Jr. ....... | H03M 7/4006 341/51 |
| 5,263,124 | A  | * | 11/1993 | Weaver ................ | G06K 9/6282 382/159 |
| 5,267,349 | A  | * | 11/1993 | Barabash ............. | G06F 9/4492 706/53 |
| 5,745,504 | A  | * | 4/1998  | B.ang.ng ............ | H03M 7/42 341/67 |
| 6,449,394 | B1 | * | 9/2002  | Florencio ............. | H03M 7/42 341/67 |
| 7,609,179 | B2 | * | 10/2009 | Diaz-Gutierrez ..... | H03M 7/40 341/50 |
| 7,644,052 | B1 | * | 1/2010  | Chang .................. | G06N 5/022 706/45 |
| 8,665,988 | B2 |   | 3/2014  | Yu et al.            |                 |
| 2001/0037324 | A1 | * | 11/2001 | Agrawal .......... | G06F 17/3071 |
| 2002/0176494 | A1 | * | 11/2002 | Zhao ................. | H03M 7/30 375/240 |
| 2003/0212695 | A1 | * | 11/2003 | Rissanen ........... | H03M 7/30 |
| 2006/0290539 | A1 | * | 12/2006 | Tomic ............... | H03M 7/40 341/50 |
| 2008/0133541 | A1 | * | 6/2008  | Fletcher .......... | G06F 17/30734 |

(Continued)

OTHER PUBLICATIONS amazon.com, "Toys & Games", retrieved from <https://www.amazon.com/b?ie=UTF8&node=165795011> on Jul. 6, 2016, 7 pages.

(Continued)

*Primary Examiner* — Vivek Srivastava
*Assistant Examiner* — Atta Khan
(74) *Attorney, Agent, or Firm* — Alston & Bird LLP

(57) ABSTRACT

In accordance with the exemplary embodiments of the invention there is at least a method and apparatus to determine a shortest code length of at least one category of a publish-subscribe system such that a length requirement of prefix code system for the at least one category is not exceeded; and assign a prefix code of the shortest code length to each of the at least one category of the publish-subscribe system.

25 Claims, 10 Drawing Sheets

(56) References Cited

U.S. PATENT DOCUMENTS

| | | | | |
|---|---|---|---|---|
| 2008/0307069 | A1* | 12/2008 | Froment | H04L 29/12113 709/218 |
| 2012/0095943 | A1* | 4/2012 | Yankov | G06N 99/005 706/12 |
| 2013/0262485 | A1* | 10/2013 | Li | G06F 17/30241 707/754 |
| 2015/0215409 | A1* | 7/2015 | Chow | G06Q 30/0259 455/456.3 |

OTHER PUBLICATIONS

Association for Computing Machinery, Inc., "The 2012 ACM Computing Classification System", 2012, retrieved from <http://www.acm.org/about/class/2012> on Jul. 6, 2016, 6 pages.

Library of Congress, "Library of Congress Classification Outline", retrieved from <https://www.loc.gov/catdir/cpso/lcco/> on Jul. 6, 2016, 1 page.

Liu, Y., et al., "Survey of Publish Subscribe Event Systems", Technical Report TR574, Indiana University, School of Informatics and Computing, May 2003, retrieved from <http://www.cs.indiana.edu/pub/techreports/TR574.pdf> on Jul. 6, 2016, 19 pages.

Ordnance Survey, "Points of Interest: User guide and technical specification", Aug. 2009, retrieved from <http://webarchive.nationalarchives.gov.uk/20100402192348/ordnancesurvey.co.uk/oswebsite/products/pointsofinterest/pdf/poiuserguide.pdf> on Jul. 6, 2016.

Pu, Ida Mengyi, "2.3 Variable Length Codes", *Fundamental Data Compression*, 2005, 12 pages, Butterworth-Heinemann, U.S.A.

Qualcomm Technologies, Inc., "LTE Direct Always-on Device-to-Device Proximal Discovery", Aug. 2014, retrieved from <https://www.qualcomm.com/media/documents/files/lte-direct-always-on-device-to-device-proximal-discovery.pdf> on Jul. 6, 2016, 13 pages.

The Institute of Electrial and Electroics Engineers, "IEEE Computer Society—Keywords", retieved from <http://web.archive.org/web/20090715125107/http://www2.computer.org/portal/web/publications/acmtaxonomy> on Jul. 6, 2016, 38 pages.

United States Census Bureau, "North American Industry Classification System", Nov. 7, 2011, retrieved from <http://www.census.gov/cgi-bin/sssd/naics/naicsrch?chart=2012>on Jul. 6, 2016, 4 pages.

Wikipedia Contributors, "Classful Network", Wikipedia, the Free Encyclopedia, created Jun. 4, 2005, retrieved from <https://en.wikipedia.org/wiki/Classful_network> on Jul. 6, 2016, 7 pages.

Wikipedia Contributors, "Kraft's Inequality", Wikipedia, the Free Encyclopedia, created Feb. 6, 2005, retrieved from <https://en.wikipedia.org/wiki/Kraft's_inequality> on Jul. 6, 2016, 8 pages.

* cited by examiner

| Category | Subcategory | Category | Subcategory |
|---|---|---|---|
| Convenience Store | Other Convenience Store | | Clothing and Accessories |
| | Convenience Store | | Men's Apparel |
| Food and Drink | Food-Beverage Specialty Store | Clothing and Accessories | Women's Apparel |
| | Grocery | | Children's Apparel |
| | Specialty Food Store | | Shoes-Footwear |
| | Wine and Liquor | | Specialty Clothing Store |
| | Bakery and Baked Goods Store | Consumer Goods | Consumer Goods |
| | Sweet Shop | | Sporting Goods Store |
| | Butcher | | Office Supply and Services Store |
| | Dairy Goods | | Specialty Store |
| Pharmacy | Drug-Pharmacy | | Pet Supply |
| | Drug Store | | Warehouse-Wholesale Store |
| | Pharmacy | | General Merchandise |
| Electronics | Consumer Electronics Store | | Discount Store |
| | Mobile Retailer | | Flowers and Jewelry |
| | Mobile Service Center | | Variety Store |
| | Computer and Software | | Gift, Antique and Art |
| | Entertainment Electronics | | Hair and Beauty |
| | Electronics | | Record, CD and Video |
| Hardware, House and Garden | Hardware, House and Garden | | Video and Game Rental |
| | Home Improvement-Hardware Store | | Bicycle and Bicycle Accessories Shop |
| | Home Specialty Store | | Market |
| | Floor and Carpet | | Motorcycle Accessories |
| | Furniture Store | | Non-Store Retailers |
| | Garden Center | | Pawnshop |
| | Glass and Window | | Used-Second Hand Merchandise Stores |
| | Lumber | | Adult Shop |
| | Major Appliance | | Arts and Crafts Supplies |
| | Power Equipment Dealer | | Florist |
| | Paint Store | | Jeweler |
| Bookshop | Other Bookshop | | Toy Store |
| | Book Store | Mall-Shopping Complex | Shopping Mall |
| Department Store | Department Store | | |

Figure 1. An example category structure.

FIGURE 1A

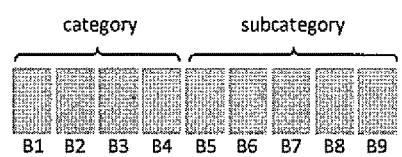

FIGURE 1B

| Category | Code | | | | | | | | | Subcategory |
|---|---|---|---|---|---|---|---|---|---|---|
| | B1 | B2 | B3 | B4 | B5 | B6 | B7 | B8 | B9 | |
| Convenience Store | 0 | 0 | 0 | 0 | 0 | 0 | 0 | 0 | 0 | Other Convenience Store |
| | | | | | 0 | 0 | 0 | 0 | 1 | Convenience Store |
| Food and Drink | 0 | 0 | 0 | 1 | 0 | 0 | 0 | 0 | 0 | Food-Beverage Specialty Store |
| | | | | | 0 | 0 | 0 | 0 | 1 | Grocery |
| | | | | | 0 | 0 | 0 | 1 | 0 | Specialty Food Store |
| | | | | | 0 | 0 | 0 | 1 | 1 | Wine and Liquor |
| | | | | | 0 | 0 | 1 | 0 | 0 | Bakery and Baked Goods Store |
| | | | | | 0 | 0 | 1 | 0 | 1 | Sweet Shop |
| | | | | | 0 | 0 | 1 | 1 | 0 | Butcher |
| | | | | | 0 | 0 | 1 | 1 | 1 | Dairy Goods |
| Pharmacy | 0 | 0 | 1 | 0 | 0 | 0 | 0 | 0 | 0 | Drug-Pharmacy |
| | | | | | 0 | 0 | 0 | 0 | 1 | Drug Store |
| | | | | | 0 | 0 | 0 | 1 | 0 | Pharmacy |
| Electronics | 0 | 0 | 1 | 1 | 0 | 0 | 0 | 0 | 0 | Consumer Electronics Store |
| | | | | | 0 | 0 | 0 | 0 | 1 | Mobile Retailer |
| | | | | | 0 | 0 | 0 | 1 | 0 | Mobile Service Center |
| | | | | | 0 | 0 | 0 | 1 | 1 | Computer and Software |
| | | | | | 0 | 0 | 1 | 0 | 0 | Entertainment Electronics |
| | | | | | 0 | 0 | 1 | 0 | 1 | Electronics |
| Hardware, House and Garden | 0 | 1 | 0 | 0 | 0 | 0 | 0 | 0 | 0 | Hardware, House and Garden |
| | | | | | 0 | 0 | 0 | 0 | 1 | Home Improvement-Hardware Store |
| | | | | | 0 | 0 | 0 | 1 | 0 | Home Specialty Store |
| | | | | | 0 | 0 | 0 | 1 | 1 | Floor and Carpet |
| | | | | | 0 | 0 | 1 | 0 | 0 | Furniture Store |
| | | | | | 0 | 0 | 1 | 0 | 1 | Garden Center |
| | | | | | 0 | 0 | 1 | 1 | 0 | Glass and Window |
| | | | | | 0 | 0 | 1 | 1 | 1 | Lumber |
| | | | | | 0 | 1 | 0 | 0 | 0 | Major Appliance |
| | | | | | 0 | 1 | 0 | 0 | 1 | Power Equipment Dealer |
| | | | | | 0 | 1 | 0 | 1 | 0 | Paint Store |
| Bookshop | 0 | 1 | 0 | 1 | 0 | 0 | 0 | 0 | 0 | Other Bookshop |
| | | | | | 0 | 0 | 0 | 0 | 1 | Book Store |
| Department Store | 0 | 1 | 1 | 0 | 0 | 0 | 0 | 0 | 0 | Department Store |
| Clothing and Accessories | 0 | 1 | 1 | 1 | 0 | 0 | 0 | 0 | 0 | Clothing and Accessories |
| | | | | | 0 | 0 | 0 | 0 | 1 | Men's Apparel |
| | | | | | 0 | 0 | 0 | 1 | 0 | Women's Apparel |
| | | | | | 0 | 0 | 0 | 1 | 1 | Children's Apparel |
| | | | | | 0 | 0 | 1 | 0 | 0 | Shoes-Footwear |
| | | | | | 0 | 0 | 1 | 0 | 1 | Specialty Clothing Store |
| Consumer Goods | 1 | 0 | 0 | 0 | 0 | 0 | 0 | 0 | 0 | Consumer Goods |
| | | | | | 0 | 0 | 0 | 0 | 1 | Sporting Goods Store |
| | | | | | 0 | 0 | 0 | 1 | 0 | Office Supply and Services Store |
| | | | | | 0 | 0 | 0 | 1 | 1 | Specialty Store |
| | | | | | 0 | 0 | 1 | 0 | 0 | Pet Supply |
| | | | | | 0 | 0 | 1 | 0 | 1 | Warehouse-Wholesale Store |
| | | | | | 0 | 0 | 1 | 1 | 0 | General Merchandise |
| | | | | | 0 | 0 | 1 | 1 | 1 | Discount Store |
| | | | | | 0 | 1 | 0 | 0 | 0 | Flowers and Jewelry |
| | | | | | 0 | 1 | 0 | 0 | 1 | Variety Store |
| | | | | | 0 | 1 | 0 | 1 | 0 | Gift, Antique and Art |
| | | | | | 0 | 1 | 0 | 1 | 1 | Hair and Beauty |
| | | | | | 0 | 1 | 1 | 0 | 0 | Record, CD and Video |
| | | | | | 0 | 1 | 1 | 0 | 1 | Video and Game Rental |
| | | | | | 0 | 1 | 1 | 1 | 0 | Bicycle and Bicycle Accessories Shop |
| | | | | | 0 | 1 | 1 | 1 | 1 | Market |
| | | | | | 1 | 0 | 0 | 0 | 0 | Motorcycle Accessories |
| | | | | | 1 | 0 | 0 | 0 | 1 | Non-Store Retailers |
| | | | | | 1 | 0 | 0 | 1 | 0 | Pawnshop |
| | | | | | 1 | 0 | 0 | 1 | 1 | Used-Second Hand Merchandise Stores |
| | | | | | 1 | 0 | 1 | 0 | 0 | Adult Shop |
| | | | | | 1 | 0 | 1 | 0 | 1 | Arts and Crafts Supplies |
| | | | | | 1 | 0 | 1 | 1 | 0 | Florist |
| | | | | | 1 | 0 | 1 | 1 | 1 | Jeweler |
| | | | | | 1 | 1 | 0 | 0 | 0 | Toy Store |
| Mall-Shopping Complex | 1 | 0 | 0 | 1 | 0 | 0 | 0 | 0 | 0 | Shopping Mall |

FIGURE 2B

| Category | Code | | | | | | | Subcategory |
|---|---|---|---|---|---|---|---|---|
| | B1 | B1 | B2 | B3 | B4 | B5 | B7 | |
| Convenience Store | 0 | 0 | 0 | 0 | 0 | 0 | 0 | Other Convenience Store |
| | 0 | 0 | 0 | 0 | 0 | 0 | 1 | Convenience Store |
| Food and Drink | 0 | 0 | 0 | 0 | 0 | 1 | 0 | Food-Beverage Specialty Store |
| | 0 | 0 | 0 | 0 | 0 | 1 | 1 | Grocery |
| | 0 | 0 | 0 | 0 | 1 | 0 | 0 | Specialty Food Store |
| | 0 | 0 | 0 | 0 | 1 | 0 | 1 | Wine and Liquor |
| | 0 | 0 | 0 | 0 | 1 | 1 | 0 | Bakery and Baked Goods Store |
| | 0 | 0 | 0 | 0 | 1 | 1 | 1 | Sweet Shop |
| | 0 | 0 | 0 | 1 | 0 | 0 | 0 | Butcher |
| | 0 | 0 | 0 | 1 | 0 | 0 | 1 | Dairy Goods |
| Pharmacy | 0 | 0 | 0 | 1 | 0 | 1 | 0 | Drug-Pharmacy |
| | 0 | 0 | 0 | 1 | 0 | 1 | 1 | Drug Store |
| | 0 | 0 | 0 | 1 | 1 | 0 | 0 | Pharmacy |
| Electronics | 0 | 0 | 0 | 1 | 1 | 0 | 1 | Consumer Electronics Store |
| | 0 | 0 | 0 | 1 | 1 | 1 | 0 | Mobile Retailer |
| | 0 | 0 | 0 | 1 | 1 | 1 | 1 | Mobile Service Center |
| | 0 | 0 | 1 | 0 | 0 | 0 | 0 | Computer and Software |
| | 0 | 0 | 1 | 0 | 0 | 0 | 1 | Entertainment Electronics |
| | 0 | 0 | 1 | 0 | 0 | 1 | 0 | Electronics |
| Hardware, House and Garden | 0 | 0 | 1 | 0 | 0 | 1 | 1 | Hardware, House and Garden |
| | 0 | 0 | 1 | 0 | 1 | 0 | 0 | Home Improvement-Hardware Store |
| | 0 | 0 | 1 | 0 | 1 | 0 | 1 | Home Specialty Store |
| | 0 | 0 | 1 | 0 | 1 | 1 | 0 | Floor and Carpet |
| | 0 | 0 | 1 | 0 | 1 | 1 | 1 | Furniture Store |
| | 0 | 0 | 1 | 1 | 0 | 0 | 0 | Garden Center |
| | 0 | 0 | 1 | 1 | 0 | 0 | 1 | Glass and Window |
| | 0 | 0 | 1 | 1 | 0 | 1 | 0 | Lumber |
| | 0 | 0 | 1 | 1 | 0 | 1 | 1 | Major Appliance |
| | 0 | 0 | 1 | 1 | 1 | 0 | 0 | Power Equipment Dealer |
| | 0 | 0 | 1 | 1 | 1 | 0 | 1 | Paint Store |
| Bookshop | 0 | 0 | 1 | 1 | 1 | 1 | 0 | Other Bookshop |
| | 0 | 0 | 1 | 1 | 1 | 1 | 1 | Book Store |
| Department Store | 0 | 1 | 0 | 0 | 0 | 0 | 0 | Department Store |
| Clothing and Accessories | 0 | 1 | 0 | 0 | 0 | 0 | 1 | Clothing and Accessories |
| | 0 | 1 | 0 | 0 | 0 | 1 | 0 | Men's Apparel |
| | 0 | 1 | 0 | 0 | 0 | 1 | 1 | Women's Apparel |
| | 0 | 1 | 0 | 0 | 1 | 0 | 0 | Children's Apparel |
| | 0 | 1 | 0 | 0 | 1 | 0 | 1 | Shoes-Footwear |
| | 0 | 1 | 0 | 0 | 1 | 1 | 0 | Specialty Clothing Store |
| Consumer Goods | 0 | 1 | 0 | 0 | 1 | 1 | 1 | Consumer Goods |
| | 0 | 1 | 0 | 1 | 0 | 0 | 0 | Sporting Goods Store |
| | 0 | 1 | 0 | 1 | 0 | 0 | 1 | Office Supply and Services Store |
| | 0 | 1 | 0 | 1 | 0 | 1 | 0 | Specialty Store |
| | 0 | 1 | 0 | 1 | 0 | 1 | 1 | Pet Supply |
| | 0 | 1 | 0 | 1 | 1 | 0 | 0 | Warehouse-Wholesale Store |
| | 0 | 1 | 0 | 1 | 1 | 0 | 1 | General Merchandise |
| | 0 | 1 | 0 | 1 | 1 | 1 | 0 | Discount Store |
| | 0 | 1 | 0 | 1 | 1 | 1 | 1 | Flowers and Jewelry |
| | 0 | 1 | 1 | 0 | 0 | 0 | 0 | Variety Store |
| | 0 | 1 | 1 | 0 | 0 | 0 | 1 | Gift, Antique and Art |
| | 0 | 1 | 1 | 0 | 0 | 1 | 0 | Hair and Beauty |
| | 0 | 1 | 1 | 0 | 0 | 1 | 1 | Record, CD and Video |
| | 0 | 1 | 1 | 0 | 1 | 0 | 0 | Video and Game Rental |
| | 0 | 1 | 1 | 0 | 1 | 0 | 1 | Bicycle and Bicycle Accessories Shop |
| | 0 | 1 | 1 | 0 | 1 | 1 | 0 | Market |
| | 0 | 1 | 1 | 0 | 1 | 1 | 1 | Motorcycle Accessories |
| | 0 | 1 | 1 | 1 | 0 | 0 | 0 | Non-Store Retailers |
| | 0 | 1 | 1 | 1 | 0 | 0 | 1 | Pawnshop |
| | 0 | 1 | 1 | 1 | 0 | 1 | 0 | Used-Second Hand Merchandise Stores |
| | 0 | 1 | 1 | 1 | 0 | 1 | 1 | Adult Shop |
| | 0 | 1 | 1 | 1 | 1 | 0 | 0 | Arts and Crafts Supplies |
| | 0 | 1 | 1 | 1 | 1 | 0 | 1 | Florist |
| | 0 | 1 | 1 | 1 | 1 | 1 | 0 | Jeweler |
| | 0 | 1 | 1 | 1 | 1 | 1 | 1 | Toy Store |
| Mall-Shopping Complex | 1 | 0 | 0 | 0 | 0 | 0 | 0 | Shopping Mall |

A flat coding scheme.

FIGURE 3

```
Algorithm: MACH
Input: A category tree with depth H
Process:
    for each node x at level H do
        DDL(x)=0;
    endfor
    d=H-1;
    while d>=0 do
        for each node x at level d do
            C=children-coding(DDL(x₁),DDL(x₂),…,DDL(xₙ));  /* xᵢ is a child of x
*/
            for each i from 1 to n do
                code(xᵢ)=C[i];
                CCL(xᵢ)=length(code(xᵢ))+DDL(xᵢ);
            endfor
            DDL(x)=max(CCL(x₁),CCL(x₂),…,CCL(xₙ));
        endfor
        d=d-1;
    endwhile
```

```
Procedure: children-coding(m₁,m₂,…,mₙ)
    if n=1 then
        C=(0)
    else
```
$l_i = \lceil \log_2(\sum_{j=1}^{n} 2^{m_j}) \rceil - m_i$ for each $1 \leq i \leq n$;
```
        while true
            k=argmax(lᵢ);  /* argmax returns the index with the maximum value */
            lₖ=lₖ-1;
```
            if $\sum_{i=1}^{n} (\frac{1}{2})^{l_i} > 1$ then
```
                lₖ=lₖ+1;
                break;
            endif
        endwhile
        C=binary-tree-pruning(l₁,l₂,…,lₙ);
    endif
    return C
```

```
Procedure: binary-tree-pruning(l₁,l₂,…,lₙ)
    Q=argsort(l₁,l₂,…,lₙ);  /* argsort returns the indices that sort l₁,l₂,…,lₙ
*/
    build a full binary tree of depth l_Q[n];  /* l_Q[n] is the max of l₁,l₂,…,lₙ
*/
    for each node x except root do
        if x is a left child then
            label(x)=0;
        else
            label(x)=1;
        endif
    for d from 1 to n do
        find the left most node x at depth l_Q[d] and remove all of its
descendants;
        c_d=concatenation of labels along the path from root to x;
    endfor
    return (c₁,c₂,…,cₙ)
```

Figure 5. Pseudo code of the MACH algorithm

| Category | B1 | B2 | B3 | B4 | B5 | B6 | B7 | Subcategory |
|---|---|---|---|---|---|---|---|---|
| Consumer Goods | 0 | 0 | 0 | 0 | 0 | 0 |  | Consumer Goods |
|  | 0 | 0 | 0 | 0 | 0 | 1 |  | Sporting Goods Store |
|  | 0 | 0 | 0 | 0 | 1 | 0 |  | Office Supply and Services Store |
|  | 0 | 0 | 0 | 0 | 1 | 1 |  | Specialty Store |
|  | 0 | 0 | 0 | 1 | 0 | 0 |  | Pet Supply |
|  | 0 | 0 | 0 | 1 | 0 | 1 |  | Warehouse-Wholesale Store |
|  | 0 | 0 | 0 | 1 | 1 | 0 |  | General Merchandise |
|  | 0 | 0 | 0 | 1 | 1 | 1 | 0 | Discount Store |
|  | 0 | 0 | 0 | 1 | 1 | 1 | 1 | Flowers and Jewelry |
|  | 0 | 0 | 1 | 0 | 0 | 0 | 0 | Variety Store |
|  | 0 | 0 | 1 | 0 | 0 | 1 | 0 | Gift, Antique and Art |
|  | 0 | 0 | 1 | 0 | 0 | 1 | 1 | Hair and Beauty |
|  | 0 | 0 | 1 | 0 | 1 | 0 | 0 | Record, CD and Video |
|  | 0 | 0 | 1 | 0 | 1 | 0 | 1 | Video and Game Rental |
|  | 0 | 0 | 1 | 0 | 1 | 1 | 0 | Bicycle and Bicycle Accessories Shop |
|  | 0 | 0 | 1 | 0 | 1 | 1 | 1 | Market |
|  | 0 | 0 | 1 | 1 | 0 | 0 | 0 | Motorcycle Accessories |
|  | 0 | 0 | 1 | 1 | 0 | 0 | 1 | Non-Store Retailers |
|  | 0 | 0 | 1 | 1 | 0 | 1 | 0 | Pawnshop |
|  | 0 | 0 | 1 | 1 | 0 | 1 | 1 | Used-Second Hand Merchandise Stores |
|  | 0 | 0 | 1 | 1 | 1 | 0 | 0 | Adult Shop |
|  | 0 | 0 | 1 | 1 | 1 | 0 | 1 | Arts and Crafts Supplies |
|  | 0 | 0 | 1 | 1 | 1 | 1 | 0 | Florist |
|  | 0 | 0 | 1 | 1 | 1 | 1 | 1 | Jeweler |
|  | 0 | 0 | 1 | 1 | 0 | 0 | 0 | Toy Store |
| Hardware, House and Garden | 0 | 1 | 0 | 0 | 0 | 0 |  | Hardware, House and Garden |
|  | 0 | 1 | 0 | 0 | 0 | 1 |  | Home Improvement-Hardware Store |
|  | 0 | 1 | 0 | 0 | 1 | 0 |  | Home Specialty Store |
|  | 0 | 1 | 0 | 0 | 1 | 1 |  | Floor and Carpet |
|  | 0 | 1 | 0 | 1 | 0 | 0 |  | Furniture Store |
|  | 0 | 1 | 0 | 1 | 0 | 1 | 0 | Garden Center |
|  | 0 | 1 | 0 | 1 | 0 | 1 | 1 | Glass and Window |
|  | 0 | 1 | 0 | 1 | 1 | 0 | 0 | Lumber |
|  | 0 | 1 | 0 | 1 | 1 | 0 | 1 | Major Appliance |
|  | 0 | 1 | 0 | 1 | 1 | 1 | 0 | Power Equipment Dealer |
|  | 0 | 1 | 0 | 1 | 1 | 1 | 1 | Paint Store |
| Food and Drink | 0 | 1 | 1 |  | 0 | 0 | 0 | Food-Beverage Specialty Store |
|  | 0 | 1 | 1 |  | 0 | 0 | 1 | Grocery |
|  | 0 | 1 | 1 |  | 0 | 1 | 0 | Specialty Food Store |
|  | 0 | 1 | 1 |  | 0 | 1 | 1 | Wine and Liquor |
|  | 0 | 1 | 1 |  | 1 | 0 | 0 | Bakery and Baked Goods Store |
|  | 0 | 1 | 1 |  | 1 | 0 | 1 | Sweet Shop |
|  | 0 | 1 | 1 |  | 1 | 1 | 0 | Butcher |
|  | 0 | 1 | 1 |  | 1 | 1 | 1 | Dairy Goods |
| Clothing and Accessories | 1 | 0 | 0 |  | 0 | 0 |  | Clothing and Accessories |
|  | 1 | 0 | 0 |  | 0 | 1 |  | Men's Apparel |
|  | 1 | 0 | 0 |  | 1 | 0 | 0 | Women's Apparel |
|  | 1 | 0 | 0 |  | 1 | 0 | 1 | Children's Apparel |
|  | 1 | 0 | 0 |  | 1 | 1 | 0 | Shoes-Footwear |
|  | 1 | 0 | 0 |  | 1 | 1 | 1 | Specialty Clothing Store |
| Electronics | 1 | 0 | 1 | 0 | 0 | 0 |  | Consumer Electronics Store |
|  | 1 | 0 | 1 | 0 | 0 | 1 |  | Mobile Retailer |
|  | 1 | 0 | 1 | 0 | 1 | 0 | 0 | Mobile Service Center |
|  | 1 | 0 | 1 | 0 | 1 | 0 | 1 | Computer and Software |
|  | 1 | 0 | 1 | 0 | 1 | 1 | 0 | Entertainment Electronics |
|  | 1 | 0 | 1 | 0 | 1 | 1 | 1 | Electronics |
| Pharmacy | 1 | 0 | 1 | 1 |  | 0 |  | Drug-Pharmacy |
|  | 1 | 0 | 1 | 1 |  | 1 | 0 | Drug Store |
|  | 1 | 0 | 1 | 1 |  | 1 | 1 | Pharmacy |
| Convenience Store | 1 | 1 | 0 | 0 |  |  | 0 | Other Convenience Store |
|  | 1 | 1 | 0 | 0 |  |  | 1 | Convenience Store |
| Bookshop | 1 | 1 | 0 | 1 |  |  | 0 | Other Bookshop |
|  | 1 | 1 | 0 | 1 |  |  | 1 | Book Store |
| Department Store | 1 | 1 | 1 | 0 |  |  | 0 | Department Store |
| Mall-Shopping Complex | 1 | 1 | 1 | 1 |  |  | 0 | Shopping Mall | category code    subcategory code    saved bit

Figure 6. MACH coding scheme for the category structure in Figure 1.

| Level 1 Category | Code | | | | | | | | | | Level 2 Category | Number of Level 3 Categories |
|---|---|---|---|---|---|---|---|---|---|---|---|---|
| | B1 | B2 | B3 | B4 | B5 | B6 | B7 | B8 | B9 | B10 | | |
| Business | | | 0 | 0 | x | x | x | x | x | x | Commerical Services | 36 |
| | | | 0 | 1 | x | x | x | x | x | x | Consumer Services | 36 |
| | | | 1 | 0 | 0 | 0 | x | x | x | x | Car Repair-Service | 10 |
| | | | 1 | 0 | 0 | 1 | | x | x | x | Truck-Semi Dealer-Services | 5 |
| | | | 1 | 0 | 1 | 0 | | | x | x | Police-Fire-Emergency | 4 |
| | | | 1 | 0 | 1 | 1 | 0 | | x | x | Car Dealer-Sales | 3 |
| | | | 1 | 0 | 1 | 1 | 1 | | x | x | Fueling Station | 3 |
| | | | 1 | 1 | 0 | 0 | 0 | | | x | Post Office | 2 |
| | | | 1 | 1 | 0 | 0 | 1 | | | x | Communication-Media | 2 |
| | | | 1 | 1 | 0 | 1 | 0 | | | x | Money-Cash Services | 2 |
| | | | 1 | 1 | 0 | 1 | 1 | | | x | Car Rental | 1 |
| | | | 1 | 1 | 1 | 0 | 0 | | | x | Tourist Information | 1 |
| | | | 1 | 1 | 1 | 0 | 1 | | | x | Business-Industry | 1 |
| | | | 1 | 1 | 1 | 1 | 0 | | | x | ATM | 1 |
| | | | 1 | 1 | 1 | 1 | 1 | | | x | Banking | 1 |
| Shopping | | | | | 0 | 0 | x | x | x | x | Consumer Goods | 25 |
| | | | | | 0 | 1 | 0 | x | x | x | Hardware, House and Garden | 11 |
| | | | | | 0 | 1 | 1 | | x | x | Food and Drink | 8 |
| | | | | | 1 | 0 | 0 | x | x | x | Clothing and Accessories | 6 |
| | | | | | 1 | 0 | 1 | 0 | x | x | Electronics | 6 |
| | | | | | 1 | 0 | 1 | 1 | x | x | Pharmacy | 3 |
| | | | | | 1 | 1 | 0 | 0 | | x | Convenience Store | 2 |
| | | | | | 1 | 1 | 0 | 1 | | x | Department Store | 1 |
| | | | | | 1 | 1 | 1 | 0 | | x | Book Store | 2 |
| | | | | | 1 | 1 | 1 | 1 | | x | Mall-Shopping Complex | 1 |
| Facilities | | | | | 0 | 0 | x | x | x | x | Sports Facility-Venue | 23 |
| | | | | | 0 | 1 | 0 | x | x | x | Hospital or Health Care Facility | 13 |
| | | | | | 0 | 1 | 1 | x | x | x | Government or Community Facility | 11 |
| | | | | | 1 | 0 | 0 | | x | x | Facilities | 7 |
| | | | | | 1 | 0 | 1 | | x | x | Education Facility | 7 |
| | | | | | 1 | 1 | 0 | | x | x | Parking Facility | 5 |
| | | | | | 1 | 1 | 1 | 0 | | x | Fair and Convention Facility | 2 |
| | | | | | 1 | 1 | 1 | 1 | | x | Library | 2 |
| Transport | | | | | | 0 | x | x | x | x | Public Transport | 17 |
| | | | | | | 1 | 0 | x | x | x | Cargo Transportation | 10 |
| | | | | | | 1 | 1 | 0 | x | x | Rest Area | 6 |
| | | | | | | 1 | 1 | 1 | x | x | Airport | 3 |
| Leisure and Outdoor | | | | | | | 0 | x | x | x | Amusement or Holiday Park | 9 |
| | | | | | | | 1 | x | x | x | Park-Recreation | 14 |
| Natural and Geographical | | | | | | | 0 | 0 | x | x | Body of Water | 7 |
| | | | | | | | 0 | 1 | | x | Mountain or Hill | 3 |
| | | | | | | | 1 | 0 | | x | Natural and Geographical | 1 |
| | | | | | | | 1 | 1 | 0 | x | Forest, Heath or Other Vegetation | 1 |
| | | | | | | | 1 | 1 | 1 | x | Undersea Feature | 1 |
| Sights and Museums | | | | | | | 0 | x | x | x | Landmark-Attraction | 9 |
| | | | | | | | 1 | 0 | x | x | Religious Place | 7 |
| | | | | | | | 1 | 1 | x | x | Museum | 5 |
| Going Out-Entertainment | | | | | | | 0 | x | x | x | Nightlife-Entertainment | 11 |
| | | | | | | | 1 | 0 | | x | Gambling-Lottery-Betting | 3 |
| | | | | | | | 1 | 1 | 0 | x | Theatre, Music and Culture | 2 |
| | | | | | | | 1 | 1 | 1 | x | Cinema | 1 |
| Eat and Drink | | | | | | | 0 | x | x | x | Restaurant | 11 |
| | | | | | | | 1 | | x | x | Coffee-Tea | 3 |
| Accommodation | | | | | | | | 0 | x | x | Lodging | 8 |
| | | | | | | | | 1 | x | x | Hotel-Motel | 3 |
| Areas and Buildings | | | | | | | | 0 | x | x | Outdoor Area-Complex | 6 |
| | | | | | | | | 1 | 0 | x | City, Town or Village | 3 |
| | | | | | | | | 1 | 1 | x | Building | 2 |

■ level 1 code     ▨ level 2 code     level 3 code     ☐ saved bit

FIGURE 7

| Level 1 Category | Level 2 Category | Number of Level 3 Categories |
|---|---|---|
| Shop | Sport | 85 |
| Shop | Food Beverages | 19 |
| Shop | Others | 15 |
| Shop | Do-It-Yourself Household Building Materials | 13 |
| Shop | Outdoors And Sport, Vehicles | 13 |
| Shop | Health And Beauty | 11 |
| Shop | Clothing Shoes Accessories | 10 |
| Shop | Furniture And Interior | 9 |
| Shop | Art, Music, Hobbies | 8 |
| Shop | Electronics | 6 |
| Shop | Stationery, Gifts, Books, Newspapers | 6 |
| Shop | General Store Department Store Mall | 5 |
| Shop | Discount Stores Charity | 3 |
| Amenity | Other | 36 |
| Amenity | Transportation | 15 |
| Amenity | Entertainment, Arts, Culture | 14 |
| Amenity | Sustenance | 10 |
| Amenity | Healthcare | 9 |
| Amenity | Education | 5 |
| Amenity | Financial | 3 |
| Highway | Attributes | 26 |
| Highway | Other Highway Features | 17 |
| Highway | Paths | 14 |
| Highway | Roads | 8 |
| Highway | Special Road Types | 6 |
| Highway | Link Roads | 5 |
| Highway | Lifecycle | 2 |
| Building | Other Buildings | 19 |
| Building | Civic Amenity | 11 |
| Building | Accommodation | 10 |
| Building | Commercial | 4 |
| Building | Additional Attributes | 4 |
| Man Made | Man Made | 41 |
| Craft | Craft | 51 |
| Historic | Historic | 23 |
| Landuse | Landuse | 30 |
| Leisure | Leisure | 26 |
| Office | Office | 29 |
| Power | Power | 19 |
| Route | Route | 17 |
| Tourism | Tourism | 21 |
| Places | Other Places | 6 |
| Places | Additional Attributes | 6 |
| Places | Administratively Declared Places | 7 |
| Places | Populated Settlements Urban | 6 |
| Places | Populated Settlements Urban And Rural | 6 |
| Railway | Tracks | 12 |
| Railway | Additional Features | 12 |
| Railway | Other Railways | 10 |
| Railway | Stations And Stops | 5 |
| Natural | Mountains Related | 12 |
| Natural | Vegetation Related | 13 |
| Natural | Water Related | 5 |
| Barrier | Access Control On Highways | 31 |
| Barrier | Linear Barriers | 9 |
| Waterway | Some Additional Attributes For Waterways | 6 |
| Waterway | Man Made Waterways | 3 |
| Waterway | Barriers On Waterways | 3 |
| Waterway | Natural Watercourses | 4 |
| Waterway | Facilities | 2 |
| Waterway | Other Features On Waterways | 2 |
| Aerialway | Aerialway | 14 |
| Aeroway | Aeroway | 11 |
| Boundary | Boundary | 10 |
| Emergency | Emergency | 13 |
| Military | Military | 10 |
| Public Transport | Public Transport | 5 |
| Geological | Geological | 4 |

Figure 8. MACH coding scheme for OpenStreetMap Map Feat

US 10,158,738 B2

OPTIMAL CODING METHOD FOR EFFICIENT MATCHING OF HIERARCHICAL CATEGORIES IN PUBLISH-SUBSCRIBE SYSTEMS

TECHNICAL FIELD

The teachings in accordance with the exemplary embodiments of this invention relate generally to filtering and matching in a computerized publish-subscribe-system and, more specifically, relate to constructing prefix codes of a shortest length to identify subscription categories.

BACKGROUND

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

Certain abbreviations that may be found in the description and/or in the Figures are herewith defined as follows:
eNB base station
LTE long term evolution
MACH minimum code assignment for category hierarchy
UE user equipment Message publish and subscribe systems have been an important way for computer network users to retrieve desired content specific information. In a publish/subscribe system, users can select message sources of content specific information according to their own requirements. Then when a publisher publishes a message which relates to a user's requirements the message is delivered to the user.

In a computerized publish-subscribe system, a category of content specific information may be represented by a sequence of binary bits (i.e., a bit string). For communication bandwidth and memory space considerations, it is desirable that the length of the bit string be minimized. On the other hand, for efficiency of computer processing, it is desirable that the matching between publication and subscription can be done by efficient prefix matching. The exemplary embodiments as described below provide at least a binary coding algorithm to reach these goals.

SUMMARY

In an exemplary aspect of the invention, there is a method comprising: determining, by a network device, a shortest code length of at least one category of a publish-subscribe system such that a maximum length requirement of prefix code system for the at least one category is not exceeded; and assigning, by the network device, a prefix code of the shortest code length to each of the at least one category of the publish-subscribe system.

In another exemplary aspect of the invention, there is an apparatus comprising: at least one processor; and at least one memory including computer program code, where the at least one memory and the computer program code are configured, with the at least one processor, to cause the apparatus to at least: determine a shortest code length of at least one category of a publish-subscribe system such that a maximum length requirement of prefix code system for the at least one category is not exceeded; and assign a prefix code of the shortest code length to each of the at least one category of the publish-subscribe system

BRIEF DESCRIPTION OF THE DRAWINGS

The foregoing and other aspects of embodiments of this invention are made more evident in the following Detailed Description, when read in conjunction with the attached Drawing Figures, wherein:

FIG. 1A shows an example category structure;
FIG. 1B shows bit allocation for a category and subcategory in accordance with the exemplary embodiments of the invention;
FIG. 2B shows a fixed-length coding scheme for the FIG. 1A example;
FIG. 3 shows a flat coding scheme;
FIG. 5 shows pseudo code of the MACH algorithm in accordance with the exemplary embodiments of the invention;
FIG. 6 shows MACH coding scheme for the category structure in FIG. 1A in accordance with the exemplary embodiments of the invention;
FIG. 7 shows the MACH coding scheme for the category structure of HERE Places in accordance with the exemplary embodiments of the invention;
FIG. 8 shows MACH coding scheme for OpenStreetMap Features in accordance with the exemplary embodiments of the invention.

DETAILED DESCRIPTION

In this invention, there is at least a method and apparatus to filter and match in a computerized publish-subscribe-system to construct prefix codes of a shortest length to identify subscription categories.

This invention relates to filtering/matching in a computerized publish-subscribe system. Publish-subscribe is a widely used mechanism for scalable communication of information. In this mechanism, publications are characterized into categories (also called topics, subjects, channels, classes, groups, etc.), without knowledge of what subscriptions there may be. Subscribers register their interests in a category and then asynchronously receive publications matching their interest. In many cases, categories form a hierarchical structure. For example, there is hierarchical categorization for points of interest [1], businesses [2], goods [3], books [4], and research fields [5]. In these cases, a subscription may refer to an arbitrary level of the hierarchy. For example, a user looking for a place to eat may express a general interest on the "restaurant" category, or he/she may want to be very specific about the food style, e.g., "restaurant/Italy food".

Figure 2A:
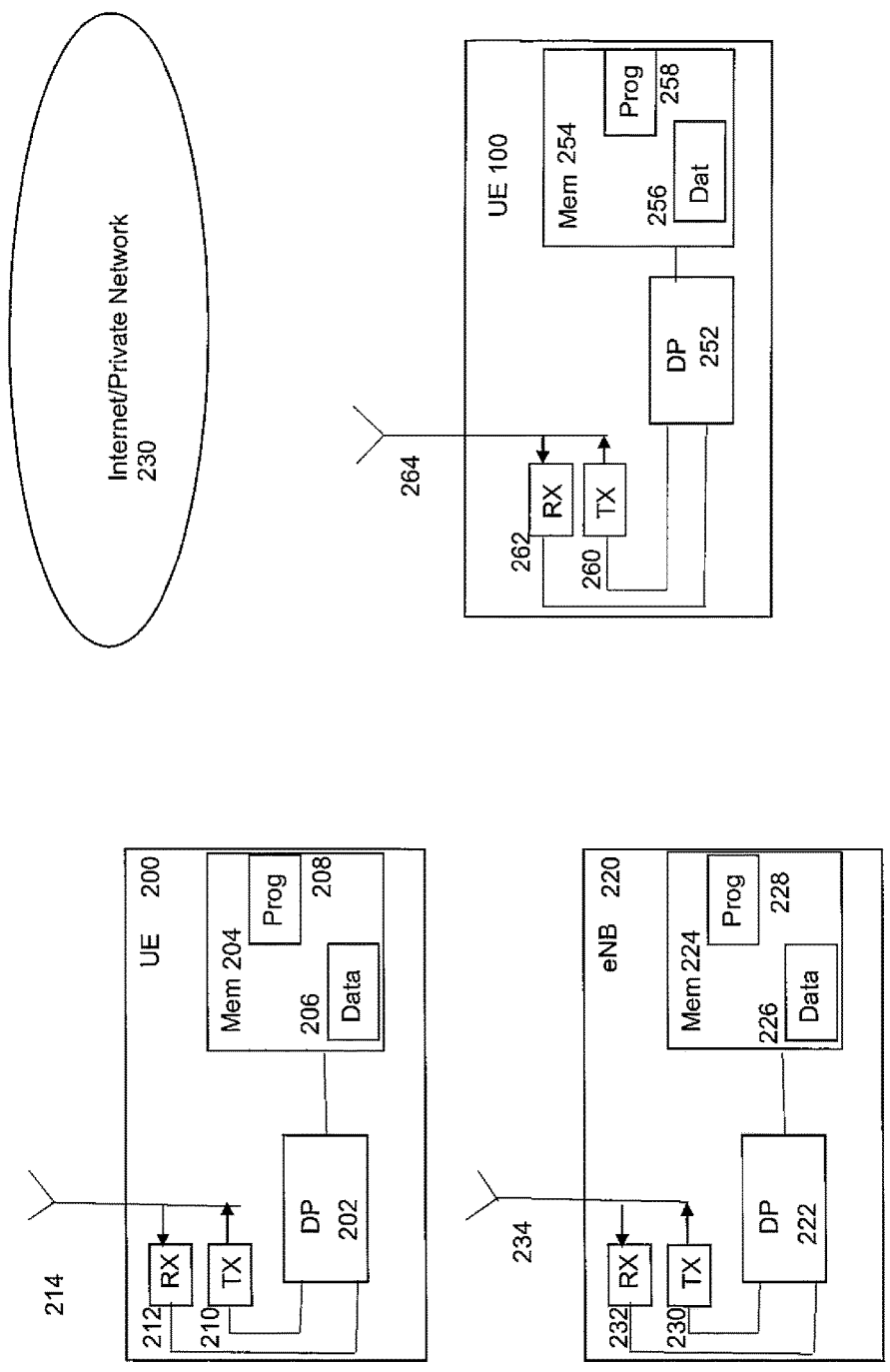
FIG. 2A shows a simplified block diagram of devices configured to perform operations in accordance with the exemplary embodiments of the invention.

Before describing the exemplary embodiments of the invention in further detail reference is now made to FIG. 2A. FIG. 2A illustrates a simplified block diagram of a base station such as an eNB 220, and user device(s) such as UE 100 and UE 200, suitable for use in practicing the exemplary embodiments of this invention. In FIG. 2A an apparatus, such as the UE 100, the UE 200 and the eNB 220, is adapted for communication with each other and other apparatuses having wireless communication capability, such as devices of the Public/Private Network 230. In accordance with the embodiments of the invention the exemplary operations may be performed using the public/private network 230 which can comprise the Internet for example, and/or any network including a network which communicates with a prefix code system and/or a publish-subscribe system.

The UE 200 includes processing means such as at least one data processor (DP) 202, storing means such as at least one computer-readable memory (MEM) 204 storing data 206 and at least one computer program (PROG) 208 or other set of executable instructions, communicating means such as a transmitter TX 210 and a receiver RX 212 for bidirectional wireless communications with the UE 100 via an antenna 214.

The eNB 220 includes processing means such as at least one data processor (DP) 222, storing means such as at least one computer-readable memory (MEM) 224 storing data 226 and at least one computer program (PROG) 228 or other set of executable instructions, communicating means such as a transmitter TX 230 and a receiver RX 232 for bidirectional wireless communications with the UE 100 via an antenna 234.

The UE 100 includes processing means such as at least one data processor (DP) 252, storing means such as at least one computer-readable memory (MEM) 254 storing data 256 and at least one computer program (PROG) 258 or other set of executable instructions, communicating means such as a transmitter TX 260 and a receiver RX 262 for bidirectional wireless communications with the UE 200 or the eNB 220 via one or more antennas 264. The UE 100, e.g. if capable of dual connectivity, may have multiple transmitters TX and receivers RX to enable simultaneous communication with UE 200 and eNB 220. In addition, it is noted that although FIG. 2A may only illustrate one transmitter TX and one receiver RX in the UE 200, the eNB 220, or the UE 100 this is non-limiting in accordance with the exemplary embodiments and these devices can each be configured to simultaneously support multiple RX and/or TX communications or chains with multiple devices. In accordance with the exemplary embodiments the data 206, 226, and/or 256 may include data required to implement a method and operate an apparatus in accordance with the exemplary embodiments of the invention.

At least one of the PROGs 208 in the UE 200 is assumed to include a set of program instructions that, when executed by the associated DP 202, enable the device to operate in accordance with the exemplary embodiment to at least determine a shortest code length of at least one category of a publish-subscribe system such that a maximum length requirement of prefix code system for the at least one category is not exceeded, and assign a prefix code of the shortest code length to each of the at least one category of the publish-subscribe system, as detailed herein in accordance with the exemplary embodiments. In these regards the exemplary embodiments of this invention may be implemented at least in part by computer software stored on the MEM 204, which is executable by the DP 202 of the UE 200, or by hardware, or by a combination of tangibly stored software and hardware (and tangibly stored firmware).

Similarly, at least one of the PROGs 228 in the eNB 220 is assumed to include a set of program instructions that, when executed by the associated DP 222, enable the device to at least enable the device to operate in accordance with the exemplary embodiment to at least determine a shortest code length of at least one category of a publish-subscribe system such that a maximum length requirement of prefix code system for the at least one category is not exceeded, and assign a prefix code of the shortest code length to each of the at least one category of the publish-subscribe system, as detailed herein in accordance with the exemplary embodiments. In these regards the exemplary embodiments of this invention may be implemented at least in part by computer software stored on the MEM 224, which is executable by the DP 222 of the eNB 220, or by hardware, or by a combination of tangibly stored software and hardware (and tangibly stored firmware).

Similarly, at least one of the PROGs 258 in the UE 100 is assumed to include a set of program instructions that, when executed by the associated DP 252, enable the device to operate in accordance with the exemplary embodiments of this invention, as detailed above. In these regards the exemplary embodiments of this invention may be implemented at least in part by computer software stored on the MEM 254, which is executable by the DP 252 of the UE 100, or by hardware, or by a combination of tangibly stored software and hardware (and tangibly stored firmware). Electronic devices implementing these aspects of the invention need not be the entire devices as depicted at FIG. 2A or may be one or more components of same such as the above described tangibly stored software, hardware, firmware and DP, or a system on a chip SOC or an application specific integrated circuit ASIC.

In general, the various embodiments of the UE 100 and the UE 200 can include, but are not limited to personal portable digital devices having wireless communication capabilities, including but not limited to cellular telephones, navigation devices, laptop/palmtop/tablet computers, smart watches, wearables, digital cameras and music devices, and Internet appliances.

Various embodiments of the computer readable MEM 204, 224, and 254 include any data storage technology type which is suitable to the local technical environment, including but not limited to semiconductor based memory devices, magnetic memory devices and systems, optical memory devices and systems, fixed memory, removable memory, disc memory, flash memory, DRAM, SRAM, EEPROM and the like. Various embodiments of the DP 202, 222, and 252 include but are not limited to general purpose computers, special purpose computers, microprocessors, digital signal processors (DSPs) and multi-core processors.

While various exemplary embodiments have been described above it should be appreciated that the practice of the invention is not limited to the exemplary embodiments shown and discussed here. Various modifications and adaptations to the foregoing exemplary embodiments of this invention may become apparent to those skilled in the relevant arts in view of the foregoing description.

Further, some of the various features of the above non-limiting embodiments may be used to advantage without the corresponding use of other described features.

The foregoing description should therefore be considered as merely illustrative of the principles, teachings and exemplary embodiments of this invention, and not in limitation thereof.

In a computerized publish-subscribe system, a category is represented by a sequence of binary bits (i.e., a bit string). For communication bandwidth and memory space considerations, it is desirable that the length of the bit string be minimized. On the other hand, for efficiency of computer processing, it is desirable that the matching between publication and subscription can be done by efficient prefix matching. This invention provides a binary coding algorithm that reaches both goals.

This invention may be applied to any category based publish-subscribe services. The publishers and subscribers may be mobile or fixed. They may reside in a single computer or distributed in a network. The communication may be wired or wireless. Example applications include newsgroup (matching of topic categories), social networks (matching of community categories), transportation (matching of POI categories), e-commerce (matching of goods categories), and middleware/internet of things (matching of event categories). Potential users of this invention are publish-subscribe system designers and service providers.

The invention is particularly useful in an environment where the communication bandwidth is highly constrained. For example, in the emerging LTE-Direct mobile peer-to-peer communication technology, such as between the UE 100 and the UE 200 of FIG. 2A, the length of each publication message is limited to 128 bits. Consider the use case in which a business uses LTD-Direct for advertising. In this case, in addition to business category, a publication message needs to encapsulate other information such as business name and location. It is therefore imperative to minimize the length of the category bit string. This invention thus has potential to serve as a standard for category coding in the forthcoming LTE-Direct wave.

A set of codes are said to be prefix codes if no code in the set is a prefix of any other code in the same set. Intuitively, if the codes of categories start with prefix codes, then the categories can be efficiently filtered or matched by a subscription to a specific prefix code. FIG. 1A illustrates an example category structure for subscription for example. As shown in FIG. 1A there are categories and subcategories associated with different categories. Suppose that we are given a two-level category structure shown in FIG. 1A, we need to assign prefix codes to each category and subcategory to enable prefix matching at an arbitrary level. A straightforward method is as follows. We determine how many bits are needed to identify a category and a subcategory respectively. There are 9 categories; 4 bits are needed to identify them ($2^3<9<2^4$). The category of "Consumer Goods" has 25 subcategories, which is the most among all categories. 5 bits are needed to identify the subcategories under "Consumer Goods" ($2^4<25<2^5$). Thus, the bit allocation as shown in FIG. 1B is feasible, as illustrated in FIG. 1B the bit allocation requires 9 bits totally. The bits are identified by the labels B1-B9.

Since the code lengths for each level is fixed, such a coding strategy is referred to as fixed-length coding. FIG. 2B shows a fixed-length coding scheme for the FIG. 1A example. As shown in FIG. 2B there is a category field and a subcategory field in addition to code bit fields B1-B9. This coding scheme enables efficient prefix matching at an arbitrary level. For example, a publication that announces a "Food and Drink/Grocery" store would contain the full code which is 000100001 as shown with the code bit fields of FIG. 2B. A subscription that is interested in "Food and Drink" (category level) would specify 0001 as the prefix. A subscription that is interested in "Grocery" (subcategory level) would specify 000100001 as the prefix. There would be a successful match in either case.

The problem with this coding scheme is that there is a lot of waste of coding space. Specifically, the length of a subcategory code is fixed to be 5 bits, even though most categories do not need this many bits to represent their subcategories. For example, the "Convenience Store" category only needs 1 bit for its two subcategories, so does "Bookshop", "Department Store", and "Mall-Shopping Complex".

Now consider another extreme coding strategy, which is to have flat codes across all subcategories. For the example shown in FIG. 1A, since there are 65 subcategories totally, 6 bits are needed. FIG. 3 shows an example coding scheme of this type. In FIG. 3, similar to FIG. 2B, there is a category field and a subcategory field in addition to code bit fields B1-B7. This coding scheme reaches the shortest possible code length but it is not clear how it can enable prefix matching at an arbitrary level.

This invention provides an algorithm, called Minimum code Assignment for Category Hierarchy (MACH), that is able to automatically produce a coding scheme for a given hierarchical category structure. The algorithm has two desirable properties: (i) code length is minimized; (ii) prefix matching at an arbitrary level is enabled. As an early advertisement, for the category structure shown in FIG. 1A, the code length produced by the MACH algorithm is only 7.

In a publish-subscribe system, a category is traditionally represented by an ASCII string, e.g., "Food and Drink", "Food and Drink/Grocery". This representation is too lengthy for a code-length constrained system. For example, "Food and Drink/Grocery" contains 22 characters and therefore would occupy 22×8=176 bits, whereas the length of a publication in a LTE-Direct system is limited to 128 bits. More compact coding is required for such a system.

Hierarchical category structures exist in many applications, such as book classification [4], industry classification [2], research field classification [8], and so on. These classification systems adopt fixed-length coding. As discussed above, this approach leads to waste of code space. Our invention adopts variable-length coding wherein the code length may be different for different categories.

There is a large body of work on lossless coding to compress digital data. A widely used technique is entropy coding (e.g., Huffman coding) which represents frequently occurring symbols with few bits and rarely occurring symbols with more bits. Thus entropy coding is variable-length coding. However, our invention has a different objective than entropy coding. The objective of entropy coding is to minimize the average code length. The objective of our invention, on the other hand, is to minimize the maximum code length. We care about the maximum code length because in a communication protocol it determines the number of bits that a publish-subscribe system needs to reserve for a category hierarchy.

U.S. Pat. No. 8,665,988 provides a method to construct prefix codes for a given set of code lengths. Specifically, given a set of code lengths $l1, l2, \ldots, ln$, the method constructs binary prefix codes $w1, w2, \ldots, wn$, such that the length of wi is li. In their case, the code lengths are given a priori, whereas in our case the code lengths are unknown and to be determined. Furthermore, they do not deal with hierarchical structures whereas the exemplary embodiments of the invention does.

The problem studied in this invention is somehow similar to Glassful network addresses. The classful network address architecture divides the IP address space into multiple address classes. All classes have a common address length (which is 32 bits for IPv4). The first few bits of an address are used as prefix code to distinguish between different classes. Each class has a different prefix code length. For example, all class A addresses start with 0, all class B addresses start with 10, all class C addresses start with 110, etc. In this way a class can be efficiently detected by prefix matching. A class with shorter prefix code leaves more bits for network addresses and therefore is able to accommodate more network hosts. The difference between the classful network address architecture and our invention is that the two systems work with different preconditions. In the case of the classful network address architecture, the prefix codes of different classes are designed a priori. The number of network addresses under each class is then constrained by the number of remaining bits. In our case, it is the other way around; the number of subcategories under each category is given a priori and we need to construct the prefix code.

Given a category hierarchy, the MACH algorithm constructs codes level by level from specific categories to general categories. For each level, the algorithm invokes a procedure called children-coding to assign codes for the categories at that level. The procedure takes as input the cumulative code lengths of lower levels. The procedure goes through two stages. At the first stage, the procedure determines the shortest possible code lengths for each category such that the length requirements of a prefix code system are satisfied. In doing this, the procedure takes into account the cumulative code lengths of lower levels such that the cumulative code lengths up to the current level are minimized. At the second stage, the procedure assigns prefix codes such that the determined code lengths are observed. Compared to fixed-length coding, the MACH algorithm generates shorter code lengths without losing the power of efficient prefix matching. In addition, the MACH algorithm automatically identifies the bits that are not necessary for prefix matching. These bits are saved to allow growth of categories. The bit saving is prioritized according to a configurable criterion. For example, the categories that are expected to grow faster get more bit saving. Furthermore, the bit saving is spread across various categories to the extent allowed by requirements of prefix codes.

This section is organized as follows. In the "Preliminaries" subsection we introduce the preliminaries including notions, denotations, and theories used in the MACH algorithm. In the "Description of the MACH Algorithm" subsection we describe the algorithm. In the "Analysis of Algorithm Properties" subsection we analyze the properties of the algorithm. In the "Examples" subsection we demonstrate the benefit of the algorithm using two real-life examples. It is noted that the described contents of these sections is not limiting and the described contents of any subsection may be found at least in part in other sections of the description.

Preliminaries

Figure 4:
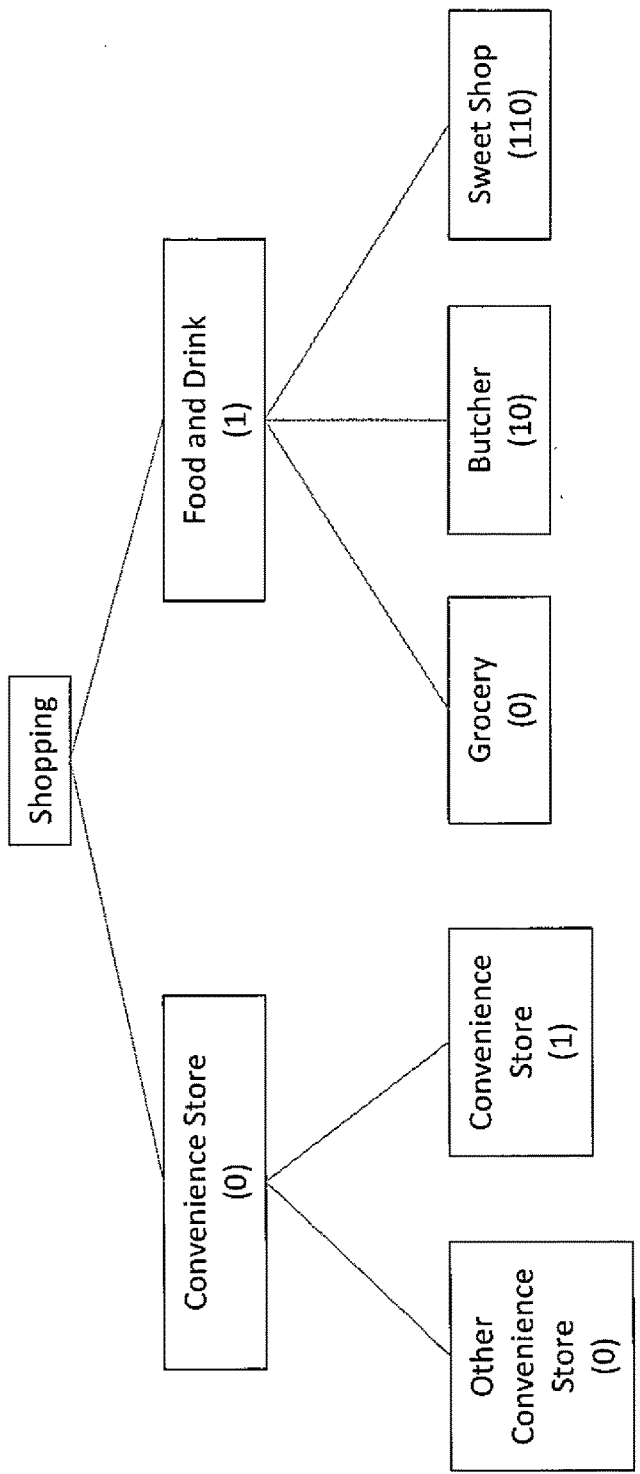
FIG. 4 shows an example category tree.

The input to our algorithm is a category hierarchy represented as a tree (see FIG. 4 for example). FIG. 4 illustrates an example category tree which includes categories and their children. Each node x of the tree corresponds to a category and each child of x corresponds to a subcategory under x. This tree is referred to as a category tree. In the rest of this report we will use the two terms "category" and "node" interchangeably. We say that the root node is at level 0, the children of the root is at level 1, . . . , and so on. Denote by H the maximum level of the tree. A codeword is a non-empty sequence of binary bits. Denote by length(c) the length of a codeword c. Denote by $\Omega(T)$ the set of nodes in a category tree T excluding the root node. Denote by $\phi$ the set of all valid codewords. A coding scheme on T is a map $\Omega(T) \rightarrow \phi$. The codeword mapped (i.e., assigned) to node x is denoted by code(x). Notice that the root node does not have a codeword. FIG. 4 shows an example coding scheme.

The full code of node x, denoted FC(x), is the concatenation of the codewords along the path starting from the root node down to x. For example, the full code of "Food and Drink/Sweet Shop" is 1110. Given a coding scheme S, the longest full code from the root to a leaf node is called the rank of S and is denoted by rank(S). The rank determines the maximum number of bits that is needed to publish or subscribe a category using the coding scheme. The dominant downstream length of node x, denoted by DDL(x), is defined to be max (y is a child of x) CCL(y), wherein CCL(y) is the cumulative code length of node y and is defined to be length (code(y))+DDL(y). Intuitively, DDL(x) indicates how many bits are needed to code all the descendants of x. CCL(x) indicates how many bits are needed to x's descendants plus x itself Clearly, rank(S)=DDL(root). For the coding scheme shown in FIG. 4, the DDL's of "Convenience Store" and "Food and Drink" are 1 and 3 respectively. The CCL's of "Convenience Store" and "Food and Drink" are 2 and 4 respectively. The rank of the coding scheme is 4.

A set of codewords is said to be a prefix code system if there is no codeword in the set that is a prefix of any other codeword in the same set. Each codeword in a prefix code system is called a prefix code. A coding scheme is said to be prefix matchable if for every d such that $1 \le d \le H$, the full codes of all level-d nodes form a prefix code system. Intuitively, if a coding scheme is prefix matchable then the full code of any category uniquely identifies itself from the other categories at the same level. In this case, full codes can be safely used in subscription for efficiently filtering/matching at an arbitrary level. Thus, the objective of the MACH algorithm is to construct a prefix matchable coding scheme with the rank minimized.

The following inequality, which is called Kraft's inequality, gives a sufficient and necessary condition for the existence of a prefix code system. Kraft's inequality: A prefix code system with the codeword lengths $l_1, l_2, \ldots, l_n$ exists if and only if $\Sigma_{i=2}^{n} (1/2)^{l_i} \le 1$.

Kraft's inequality suggests that we can always construct a legitimate prefix code system using sufficiently long codeword lengths. This idea has been discussed above. However we want the codeword lengths to be as short as possible. Kraft's inequality provides a tool for us to minimize codeword lengths without violating the length requirements of a prefix code system.

Given an ordered sequence of n natural numbers $l_1 \le l_2 \le \ldots \le l_n$ satisfying Kraft's inequality, one can construct a prefix code system with codeword lengths equal to $l_i$ by pruning subtrees from a full binary tree of depth $l_n$. First choose any node from the full tree at depth and remove all of its descendants, and then $l_2$, and so on. This construction method is introduced in Kraft and we refer to it as binary tree pruning.

Description of the MACH Algorithm

Given a category tree, the MACH algorithm builds codewords level by level from bottom up. For each node x at level-d, the algorithm invokes a procedure called children-coding to assign codeword for each children of x. The procedure takes as input the list (DDL($x_1$), DDL($x_2$), . . . , DDL($x_n$)), where $x_1, x_2, \ldots, x_n$ are the children of x. The procedure consists of two stages. At the first stage, the shortest possible codeword lengths for each child $x_i$ are determined using Kraft's inequality. At the second stage, the codewords are assigned following the determined codeword lengths. The pseudo code of the MACH algorithm including the children-coding procedure is provided in FIG. 5. More details of the children-coding procedure are discussed as follows. For simplicity of presentation, we denote DDL($x_i$) by $m_i$. The procedure goes through the following steps.

1. If x has only one child (i.e., n=1), then let code($x_i$)=0. The procedure ends. Else, go to step 2.
2. For each $1 \leq i \leq n$, let $$l_i = \lceil \log_2(\Sigma_{j=1}^{n} 2^{m_j}) \rceil - m_i$$

3. Pick $l_k$ that is the biggest among $l_1, l_2, \ldots, l_n$. When there is a tie, pick from the tied $l_i$'s the one with the least m value. When there is still a tie, pick an arbitrary one from the tied $l_i$'s.
4. Reduce $l_k$ by 1.
5. If Kraft's inequality is violated (i.e., if $\Sigma_{i=1}^{n}(1/2)^{l_i} > 1$), then increase $l_k$ by 1, go to step 6. Otherwise, go to step 2.
6. Using binary tree pruning to assign codewords code($x_i$) such that length(code($x_i$))=$l_i$. Binary tree pruning is described in http://en.wikipedia.org/wiki/Kraft's_inequality and its pseudo code pruning is provided in FIG. 5.

Let us explain the above steps. $l_i$ is used to store the code length of a child node z. Step 2 initializes $l_i$'s such that (i) they satisfy Kraft's inequality (will be proved); and (ii) $l_i$ and $m_i$ are complementary to each other (i.e., the value of $l_i + m_i$ is the same value for all i's). As will be proved, this step minimizes the DDL value of the parent node x.

At steps 3-5, some $l_i$'s are reduced without violating Kraft's inequality. The saved bits allow future growth of the category hierarchy under node x. Notice that the reduction follows a round-robin fashion in the descending order of l value. Since l and m are initially complementary to each other, effectively the child nodes with lower m values (i.e., DDL values) get more bit saving. The justification is as follows. $m_i$ bits can represent at most $2^{m_i}$ subcategories under node $x_i$. The number of subcategories under node $x_i$ is usually smaller than $2^{m_i}$, which provides a room of growth. Due to the exponential effect, generally a node with a smaller m value has a smaller room of growth. These nodes should get higher priority for bit saving. In addition, observe that by round-robin, the saving is spread across the child nodes rather than concentrated on a single one.

In the children-coding procedure, we prioritize bit saving to favor small categories. Other prioritization strategies are possible. For example, the priority may be based on the difference or ratio between the number of subcategories under node $x_i$ and the $2^{m_i}$ limit. Intuitively, if the growth speeds of categories are independent of their sizes, then the difference is a suitable priority criterion; if the growth speeds are proportional to category sizes, then the ratio is a suitable priority criterion. A priority criterion can be straight-forwardly plugged-in to the children-coding procedure.

Analysis of Algorithm Properties

Since the MACH algorithm is a recursive invocation of the children-coding procedure, we first analyze the properties of the children-coding procedure, and then the properties of the MACH algorithm.

Properties of the Children-Coding Procedure

We formulate and prove that the children-coding procedure has the following desirable properties:

C-i. The generated codewords form a prefix code system.
C-ii. The dominant downstream length of the parent node is minimized.
C-iii. A smaller category gets more bit saving than a bigger one.
C-iv. Bit saving is spread across various categories to the extent allowed by a prefix code system.

These properties are trivial when the parent node x has only one child (i.e., n=1). Therefore in the following analysis we assume that n>1.

Proposition 1 (formulation of Property (C-i)). Let $l_i$'s be the code lengths assigned by the children-coding procedure. $l_i \geq 1$ and $\Sigma_{i=1}^{n}(1/2)^{l_i} \leq 1$.

Proof: First we prove $l_i \geq 1$. Let $l_i^0$'s be the output of step 2 of the children-coding procedure. According to step 2, $$l_i^0 = \lceil \log_2(\Sigma_{j=1}^{n} 2^{m_j}) \rceil - m_i \tag{1}$$

$$= \lceil \log_2(2^{m_i} \Sigma_{j=1}^{n} 2^{m_j - m_i}) \rceil - m_i \tag{2}$$

$$= \lceil \log_2(2^{m_i}) + \log_2(\Sigma_{j=1}^{n} 2^{m_j - m_i}) \rceil - m_i \tag{3}$$

$$= \lceil m_i + \log_2(\Sigma_{j=1}^{n} 2^{m_j - m_i}) \rceil - m_i \tag{4}$$

$$= \lceil \log_2(\Sigma_{j=1}^{n} 2^{m_j - m_i}) \rceil > \tag{5}$$

$$\lceil \log_2(2^{m_i - m_i}) \rceil \tag{6}$$

$$= 0 \tag{7}$$

Thus, each $l_i$ is no less than 1 when step 2 is finished. After that $l_i$ may be reduced but it will never be smaller than 1. This is because if $l_i$ is ever reduced to 0, $\Sigma_{j=1}^{n}(1/2)^{l_j} > 1$ and thus $l_i$ will be reverted to 1 according to step 5

Now we prove $\Sigma_{i=1}^{n}(1/2)^{l_i} \leq 1$.

$$\sum_{i=1}^{n} \left(\frac{1}{2}\right)^{l_i^0} = \sum_{i=1}^{n} \left(\frac{1}{2}\right)^{\lceil \log_2(\Sigma_{j=1}^{n} 2^{m_j}) \rceil - m_i} \tag{8}$$

$$= \frac{\sum_{i=1}^{n} 2^{m_i}}{2^{\lceil \log_2(\Sigma_{j=1}^{n} 2^{m_j}) \rceil}} \leq \tag{9}$$

$$\frac{\sum_{i=1}^{n} 2^{m_i}}{2^{\log_2(\Sigma_{j=1}^{n} 2^{m_j})}} \tag{10}$$

$$= 1 \tag{11}$$

Thus, $l_i$'s satisfy Kraft's inequality when step 1 is finished. After that, $l_i$ may be reduced but step 5 guarantees that Kraft's inequality remains satisfied at the end of the procedure.

Proposition 2 (formulation of Property (C-ii)). Let $l_i$'s be the code lengths assigned by the children-coding procedure.

Let $l_i'$'s be a different code length assignment satisfying Kraft's inequality.

$$\max_{1 \leq i \leq n} (l_i + m_i) \geq \max_{1 \leq i \leq n} (l_i' + m_i).$$

Proof: Prove by contradiction. Assume that $$\max_{1 \leq i \leq n} (l_i + m_i) < \max_{1 \leq i \leq n} (l_i' + m_i).$$

We are to show that $\Sigma_{i=1}^{n}(1/2)^{l_i'} > 1$. Let $l_i^0$'s be the output of step 2 of the children-coding procedure. According to step 2, $$l_1^0 + m_1 = l_2^0 + m_2 = \ldots = l_n^0 + m_n \qquad (12)$$

$$\sum_{i=1}^n \left(\frac{1}{2}\right)^{l_i^0 - 1} = \sum_{i=1}^n \left(\frac{1}{2}\right)^{\lceil \log_2(\sum_{j=1}^n 2^{m_j}) \rceil - m_i - 1} \qquad (13)$$

$$= \frac{\sum_{i=1}^n 2^{m_i+1}}{2^{\lceil \log_2(\sum_{j=1}^n 2^{m_j}) \rceil}} \qquad (14)$$

Notice that $\lceil \log_2(\Sigma_{j=1}^n 2^{m_j}) \rceil < \log_2(\Sigma_{j=1}^n 2^{m_j}) + 1$. Thus $$\sum_{i=1}^n \left(\frac{1}{2}\right)^{l_i^0 - 1} > \frac{\sum_{i=1}^n 2^{m_i+1}}{2^{\log_2(\Sigma_{j=1}^n 2^{m_j})+1}} \qquad (15)$$

$$= \frac{2\sum_{i=1}^n 2^{m_i}}{2 \cdot 2^{\log_2(\Sigma_{j=1}^n 2^{m_j})}} \qquad (16)$$

$$= 1 \qquad (17)$$

Observe that $l_i$'s are never increased after step 2. Thus, the following inequality holds for every i.

$$l_i \le l_i^0 \qquad (18)$$

Therefore:

$$l_i + m_i \le l_i^0 + m_i \qquad (19)$$

$$\max_{1 \le i \le n}(l_i + m_i) \le \max_{1 \le i \le n}(l_i^0 + m_i) \qquad (20)$$

Because $$\max_{1 \le i \le n}(l_i + m_i) < \max_{1 \le i \le n}(l_i + m_i),$$

combining with inequality (20), we have $$\max_{1 \le i \le n}(l_i + m_i) < \max_{1 \le i \le n}(l_i^0 + m_i) \qquad (21)$$

Combining (21) and (12), we have $$\max_{1 \le i \le n}(l_i + m_i) < l_1^0 + m_1 = l_2^0 + m_2 = \cdots = l_n^0 + m_n \qquad (22)$$

Since, $$l_i + m_i \le \max_{1 \le i \le n}(l_i + m_i),$$

combining with (22), we have $$l_i + m_i < l_i^0 + m_i \qquad (23)$$

Thus, $$l_i < l_i^0 \qquad (24)$$

$$l_i \le l_i^0 - 1 \qquad (25)$$

From (15)-(17) we know that $\Sigma_{i=1}^n (1/2)^{l_i^0 - 1} > 1$. Combining with (25), we have $$\sum_{i=1}^n \left(\frac{1}{2}\right)^{l_i} \ge \sum_{i=1}^n \left(\frac{1}{2}\right)^{l_i^0 - 1} > 1 \qquad (26)$$

Proposition 3 (formulation of Property C-III). If $m_i < m_j$, then $$\max_{1 \le i \le n}(l_k + m_k) - (l_i + m_i) \ge \max_{1 \le i \le n}(l_k + m_k) - (l_j + m_j).€$$

Proof: We only need to prove that if $m_i < m_j$, then $l_i + m_i \le l_j + m_j$. Let $l_i^0$ and $l_j^0$ be the value of $l_i$ and that of $l_j$ when step 2 is finished, respectively. Clearly, $l_i^0 + m_i = l_j^0 + m_j$. Since $m_i < m_j$, $l_i^0 > l_j^0$. There are two cases afterward:
(1) $l_j$ is never reduced after step 2. In this case, regardless of whether $l_i$ is reduced or not, $l_i + m_i \le l_j + m_j$ holds at the end of the procedure.
(2) $l_j$ is reduced after step 2. In this case, consider the first time when $l_j$ is picked for reducing. Observe that at step 3, only the largest l value is picked for reducing. And when there is a tie, the one with a bigger m value is picked. Thus, when $l_j$ is picked for the first time, $l_i$ must be equal to $l_j$. In other words, $l_i$ must have already been reduced by $l_i^0 - l_j^0$. Since $m_i < m_j$, $l_i^0 - l_j^0 \ge 1$. Now $l_j$ is reduced by 1, which makes it smaller than $l_i$ by 1. After this, every time before $l_j$ is reduced by 1, $l_i$ must have been reduced by 1. Thus, the total reduction of $l_i$ from $l_i^0$ is no less than that of $l_j$ from $l_j^0$. Since $l_i^0 + m_i = l_j^0 + m_j$, $l_i + m_i \le l_j + m_j$ holds at the end of the procedure.

Proposition 4 (Formulation of Property C-IV). If $m_i < m_j$, then $l_i \ge l_j$. € Proof: Let $l_i^0$ and $l_j^0$ be the value of $l_i$ and that of $l_j$ when step 2 is finished, respectively. Clearly, $l_i^0 + m_i = l_j^0 + m_j$. Since $m_i < m_j$, $l_i^0 > l_j^0$. There are two cases afterward:
(1) $l_i$ is never reduced after step 2. In this case, $l_j$ is never reduced. $l_i > l_j$ automatically holds at the end of the procedure.
(2) $l_i$ is reduced after step 2. If $l_i$ never reaches $l_j$, then $l_j$ is never reduced. $l_i > l_j$ holds at the end of the procedure. Otherwise (if $l_i$ ever reaches $l_j$), consider the first time when $l_i$ reaches $l_j$. According to step 3, $l_j$ will have to be reduced before $l_i$ can be further reduced. Thus starting from this time, every time before $l_i$ is reduced by 1, $l_j$ must have been reduced by 1. Therefore $l_i \ge l_j$ at the end of the procedure.

Properties of the MACH Algorithm

We formulate and prove that the MACH algorithm has the following desirable properties:

M-I. The coding scheme generated by the MACH algorithm is prefix matchable.

M-II. The coding scheme generated by the MACH algorithm minimizes the rank.

Proposition 5 (formulation of Property M-I). With the coding scheme generated by the MACH algorithm, for every d such that $1 \le d \le H$, the full codes of all level-d nodes form a prefix code system. €Proof: Prove by induction on d. When d=1, a level-1 node's full code is identical to its codeword. According to Property (C-i), the codewords of all level-1 nodes form a prefix code system. Assume that the proposition holds for d=k. We are to show that the full codes of all level-(k+1) nodes form a prefix code system. Consider two different level-(k+1) nodes $x_i$ and $x_j$. We are to show that $FC(x_i)$ is not a prefix of $FC(x_j)$. Depending on whether $x_i$ and $x_j$ have a common parent, there are two cases.

(1) $x_i$ and $x_j$ have a common parent y. In this case, $FC(x_i)=FC(y)-code(x_i)$ and $FC(x_j)=FC(y)-code(x_j)$. Since $code(x_i)$ is not a prefix of $code(x_j)$, $FC(x_i)$ is not a prefix of $FC(x_j)$.

(2) $x_i$ and $x_j$ have two different parents $y_i$ and $y_j$ respectively. In this case, $FC(x_i)=FC(y_i)-code(x_i)$ and $FC(x_j)=FC(y_j)-code(x_j)$. Let $q=min(length(FC(y_i)), length(FC(y_j)))$. Since $FC(y_i)$ is not a prefix of $FC(y_j)$ and $FC(y_j)$ is not a prefix of $FC(y_i)$, the first q bits of $FC(y_i)$ are not identical to those of $FC(y_j)$. Thus the first q bits of $FC(x_i)$ are not identical to those of $FC(x_j)$. Therefore $FC(y_i)$ is not a prefix of $FC(y_j)$.

Proposition 6 (formulation of Property M-II). Let S be the coding scheme generated by the MACH algorithm for a category tree and $\tilde{S}$ be a prefix matchable coding scheme for the same category tree. rank(S)≤($\tilde{S}$). €Proof: Prove by induction on H. When H=1, the proposition holds according to Proposition 2. Assume that the proposition holds for H=k. We are to show that rank(S)≤rank($\tilde{S}$) if S and $\tilde{S}$ are prefix matchable coding schemes on a category tree with H=k+1. Let $x_1, x_2, \ldots, x_n$ be the level-1 nodes. Denote by $S(x_i)$ the part of S for the subtree rooted at each $x_i$. Since S is prefix matchable, $S(x_i)$ is also prefix matchable. The same is true for $\tilde{S}(x_i)$. Thus, rank($S(x_i)$)≤rank($\tilde{S}(x_i)$). Observe that rank $(S(x_i))$'s are input values (i.e., m values) to the children-coding procedure invoked on the root node. According Proposition 2, $$\text{rank}(S) = \max_{1 \le i \le n} \left( \text{length}(\text{code}(x_i)) + \text{rank}(S(x_i)) \right) \le$$
$$\max_{1 \le i \le n} \left( \text{length}(\text{code}(x_i)) + \text{rank}(\tilde{S}(x_i)) \right) = \text{rank}(\tilde{S}) \quad (20)$$

EXAMPLES

In this subsection we provide three examples to demonstrate the MACH algorithm. The first example is the coding scheme generated by MACH for the category structure shown in FIG. 1A. The second example is the category structure of HERE Places which is a significant extension of the first example. The third example is the category structure of OpenStreetMap Map Features.

It is noted that the term "HERE places" as used herein is non-limiting and can refer to categories of any company, corporation, or other entity which uses subscription categories as referenced herein.

Example 1

Category Structure in FIG. 1A

FIG. 6 shows the MACH coding scheme for the category structure shown in FIG. 1A. The coding scheme is presented in the order of category size. Compared to the fixed-length scheme shown in FIG. 2B, the MACH scheme reduces the code length from 9 to 7. Yet the MACH scheme is prefix matchable. For example, a publication that announces a "Food and Drink/Grocery" store would contain a full code which is 011001. A subscription that is interested in "Food and Drink" would specify 011 as the prefix. A subscription that is interested in "Grocery Store" (subcategory level) would specify 011001 as the prefix. There would be a successful match in either case. Furthermore, observe that a lower bound of code length is 6, which is the number of bits required to distinguish among all subcategories without guaranteeing a prefix code system (see FIG. 3). The MACH scheme is only 1 bit higher than this lower bound.

The blank cells in FIG. 6 are saved bits. The saved bits can be used to accommodate category growth without violating the length requirement of a prefix code system. For example, two bits are saved for the Book Shop category. This saving allows the Book Shop to have as many as 8 subcategories (compared to the current 2 subcategories). Observe that smaller categories such as Book Shop get more bit saving than larger categories such as Food and Drink. Also observe that bit saving is nicely spread across various categories. Both of these two behaviors reflect the properties of MACH algorithm as at least discussed above in the Analysis of Algorithm Properties subsection.

Example 2

HERE Places

FIG. 7 shows the MACH coding scheme for the category structure of HERE Places. It is a 3-level structure. For clarity of presentation, the codewords for level-3 categories under a level-2 are collapsed to a single line of "x" symbols. As the figure shows, the MACH scheme uses 10 bits. To put the result into perspective, a fixed-length scheme would need 14 bits. A flat coding scheme, which gives a lower bound, would need 9 bits.

Consider the saved bits (blank cells) between level-1 codewords and level-2 codewords. Let us discuss how these bits can be used to accommodate category growth. These bits can shift to level-2 codewords, in which case more level-2 categories can be accommodated; or they can shift to level-3 codewords, in which case more level-3 categories can be accommodated. For example, the level-1 category "Accommodation" has two saved bits between its level-1 codeword and level-2 codewords. If some time in the future there are more than two subcategories of "Accommodation", then one or both of the saved bits can shift to level-2 codewords. Or if there are more than 8 kinds of "Lodging", then one or both of the saved bits can shift to level-3 codewords.

Example 3

OpenStreetMap Map Features

The OpenStreetMap Features categorizes physical features on the ground (see FIG. 8). The MACH scheme uses 12 bits. On the other hand, a fixed-length scheme would need 16 bits. A lower bound length given by flat coding is 10 bits.

The Table below summarizes the comparison of code length among MACH coding, fixed-length coding, and flat coding for the three examples discussed in this subsection.

|  | Fixed-length | MACH | Flat (i.e. lower bound) |
| --- | --- | --- | --- |
| Example 1 | 9 | 7 | 6 |
| HERE Places | 14 | 10 | 9 |
| OpenStreetMap Map Features | 16 | 12 | 10 |

Advantages of at least the method in accordance with the exemplary embodiments includes:

Compared to fixed-length coding, MACH coding has a shorter code length without losing the power of prefix matching.

MACH coding saves bits to allow growth of categories.

The bit saving is prioritized such that the categories that are easier to reach code capacity gets more bit saving.

The bit saving is spread across various categories rather than concentrated on a small group.]

Further, in accordance with the exemplary embodiments there is subscribing, based at least on a determined shortest code length of at least one category of a publish-subscribe system as described herein, a user to receive content specific subscriptions, and facilitating sending the subscriptions to the user via electronic and/or mail order methods.

Figure 9:
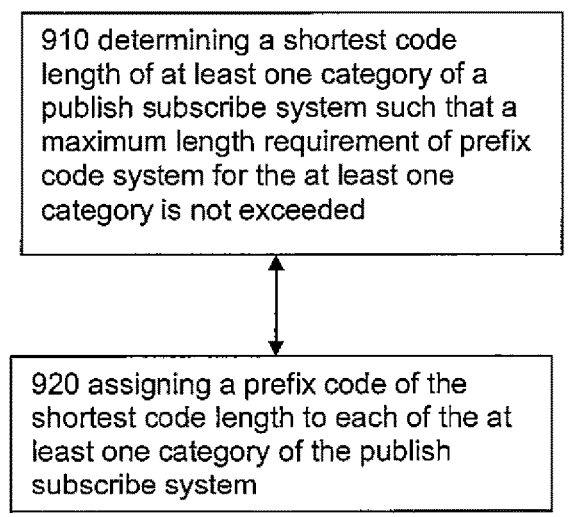
FIG. 9 shows a method in accordance with the exemplary embodiments which may be performed by an apparatus.

FIG. 9 illustrates operations which may be performed by a network device such as, but not limited to, a network device (e.g., a UE 100 and/or a UE 200 and/or eNB 220 as in FIG. 2A). As shown in step 910 of FIG. 9, there is determining a shortest code length of at least one category of a publish-subscribe system such that a maximum length requirement of prefix code system for the at least one category is not exceeded. At step 920 there is assigning a prefix code of the shortest code length to each of the at least one category of the publish-subscribe system.

In accordance with the exemplary embodiments as described in the paragraph above, each category includes a subcategory, and wherein the determining the shortest code length of a category is taking into account the subcategory.

In accordance with the exemplary embodiments as described in the paragraphs above, the determining comprises identifying code bits of a code length of at least one of the category and the subcategory that are not necessary for prefix matching and removing the bits from the code length.

In accordance with the exemplary embodiments as described in the paragraphs above, the determining comprises applying a minimum code assignment for category hierarchy algorithm first to bits of the subcategory and then the category to determine the shortest code length of the at least one category.

In accordance with the exemplary embodiments as described in the paragraphs above, the determining takes as input a list $(DDL(x_1), DDL(x_2), \ldots, DDL(x_n))$, wherein $x_1, x_2, \ldots, x_n$ are the descendants of x, wherein the descendants comprise subcategories, and wherein $DDL(x)$ indicates how many bits are needed to code all the descendants of x.

In accordance with the exemplary embodiments as described in the paragraphs above, the determining takes as input a list $(DDL(x_1), DDL(x_2), \ldots, DDL(x_n))$, wherein $x_1, x_2, \ldots, x_n$ are children of x, wherein the children comprise subcategories, and wherein $DDL(x)$ indicates how many bits are needed to code all the children of x.

In accordance with the exemplary embodiments as described in the paragraphs above, there is determining a number of children of x; for a case where the number of children of x=1 then let code (x1)=0, else for a case where the number of children of x>1 then compute a value l for each of the children of x, where l is an integer.

In accordance with the exemplary embodiments as described in the paragraphs above, where computing the value l for each of the children of x comprises computing:

For each $1 \leq i \leq n$, let $$l_i = \lceil \log_2(\Sigma_{j=1}^{n} 2^{m_j}) \rceil - m_i$$

In accordance with the exemplary embodiments as described in the paragraphs above, there is picking a biggest value lk of the values $l_1, l_2, \ldots, l_n$; reducing the value $l_k$ by 1; determining for the value $l_k$ if inequality is violated, wherein for a case the inequality is violated then increase $l_k$ by 1, else compute a value 1 for $l_k$.

In accordance with the exemplary embodiments as described in the paragraphs above, there is using binary tree pruning to assign codewords code $(x_i)$ such that length(code $(x_i)$)=$l_i$.

In accordance with the exemplary embodiments as described in the paragraphs above, the prefix code system comprises a set of codewords, and wherein each codeword of the set of codewords is a prefix code.

In accordance with the exemplary embodiments as described in the paragraphs above, there is sending a message comprising the assigned prefix code to the publish-subscribe system to subscribe to the at least one category of the publish-subscribe system.

In accordance with an exemplary embodiment of the invention as described above there is an apparatus comprising: means for determining [e.g., DP202, DP222, and/or DP252], by a device [UE 100 and/or a UE 200 and/or a eNB 220 as in FIG. 2A] of a communication network, a shortest code length of at least one category of a publish-subscribe system such that a maximum length requirement of prefix code system for the at least one category is not exceeded. Means for assigning [e.g., DP202, DP222, and/or DP252] a prefix code of the shortest code length to each of the at least one category of a publish-subscribe system as in accordance with the exemplary embodiments of the invention.

In the exemplary aspect of the invention according to the paragraph above, wherein the means for determining and assigning comprises a non-transitory computer readable medium [MEM 204, 224, and/or 254] encoded with a computer program [PROG 208, 228, and/or 258]; and/or [Data 206, 226, and 256] executable by at least one processor [DP 202, 222, and/or 252].

The apparatus may be, include or be associated with at least one software application, module, unit or entity configured as arithmetic operation, or as a computer program or portions thereof (including an added or updated software routine), executed by at least one operation processor, unit or module. Computer programs, also called program products or simply programs, including software routines, applets and/or macros, may be stored in any apparatus-readable data storage medium. A computer program product may comprise one or more computer-executable components which, when the program is run, are configured to carry out embodiments described above by means of FIG. 9. Additionally, software routines may be downloaded into the apparatus.

The apparatus, such as an access node or user device, or a corresponding component, may be configured as a computer or a microprocessor, such as single-chip computer element, or as a chipset, including or being coupled to a memory for providing storage capacity used for software or arithmetic operation(s) and at least one operation processor for executing the software or arithmetic operation(s).

In general, the various embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

The foregoing description has provided by way of exemplary and non-limiting examples a full and informative description of the best method and apparatus presently contemplated by the inventors for carrying out the invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention.

It should be noted that the terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and/or printed electrical connections, as well as by the use of electromagnetic energy, such as electromagnetic energy having wavelengths in the radio frequency region, the microwave region and the optical (both visible and invisible) region, as several non-limiting and non-exhaustive examples.

Furthermore, some of the features of the preferred embodiments of this invention could be used to advantage without the corresponding use of other features. As such, the foregoing description should be considered as merely illustrative of the principles of the invention, and not in limitation thereof.

What is claimed is:

1. A method for matching publications to subscriptions of a publish-subscribe system using prefix codes having a fewest number of bits for identifying a plurality of categories having a hierarchy and corresponding to the publish-subscribe system while providing for prefix matching at an arbitrary level of the hierarchy, the method comprising:
receiving, by a network device, a category tree comprising the plurality of categories, each category having a level, wherein the category tree corresponds to the publish-subscribe system having a length requirement of a prefix code system, the length requirement being a number of bits reserved by the publish-subscribe system for an indication of a category;
determining, by the network device, a first level category code length for each first level category of a first level of the category tree such that the length requirement of the prefix code system for the first level is not exceeded based on a number of categories of the plurality of categories that are sub-categories of the first level category, wherein a first first level category and a second first level category have first level category code lengths that are different;
assigning, by the network device, a first prefix code of the corresponding first level category code length to each category of the first level, wherein each subscription of the publish-subscribe system being stored in association with at least one first prefix code, the at least one first prefix code enabling category matching at the first level;
determining, by the network device, for each category of the first level of the category tree, a second level shortest code length for one or more second categories of the plurality of categories that correspond to a second level of the category tree and that are sub-categories of the category of the first level, the second level shortest code length being determined (a) based on a number of the one or more second categories that are sub-categories of the category of the first level and (b) such that the length requirement of the prefix code system for the second categories is not exceeded, wherein a first second level category that is a sub-category of the first first level category and a second second level category that is a sub-category of the second first level category have second level shortest code lengths that are different thereby reducing the number of bits required to provide a prefix code that enables prefix matching at an arbitrary level of the hierarchy;
assigning, by the network device, a second prefix code of the second level shortest code length to each of the second categories; and
matching at least one publication to at least one subscription based on at least one first prefix code and optionally a second prefix code associated with the at least publication and one or more first prefix codes and optionally one or more corresponding second prefix codes associated with the at least one subscription, wherein the at least one publication is provided in accordance with the matched at least one subscription via a transmission having the number of bits corresponding to the length requirement reserved for indication of a category corresponding to the at least one publication and the matched at least one subscription.

2. The method according to claim 1, wherein the determining the first level shortest code length of a category is taking into account the second category.

3. The method according to claim 2, wherein a number of categories that are subcategories of the first category is known priori by the network device.

4. The method according to claim 2, wherein the determining comprises identifying code bits of a code length of at least one of the first category and the one or more second categories that are not necessary for prefix matching and removing the bits from the code length.

5. The method according to claim 4, wherein the determining comprises applying a minimum code assignment for category hierarchy algorithm first to bits of the second category and then the first category to determine a shortest code length of the category tree, the shortest code length of the category tree being at least the sum of the first level shortest code length and the second level shortest code length.

6. The method according to claim 5, wherein the determining takes as input a list $(DDL(x_1), DDL(x_2), \ldots, DDL(x_n))$, wherein $x_1, x_2, \ldots, x_n$ are the one or more second categories of the first category, and wherein DDL(x) indicates how many bits are needed to code all the second categories.

7. The method according to claim 6, comprising:
determining a number of the second categories;
for a case where the number of second categories equals 1 then let code $(x_1)=0$,
else for a case where the number of second categories is greater than 1 then compute a value l for each of the second categories, where l is an integer.

8. The method according to claim 7, where computing the value l for each of the second categories comprises computing:
For each $1 \le i \le n$, let $$l_i = \lceil \log_2(\Sigma_{j=1}^{n} 2^{m_j}) \rceil - m_i$$

9. The method according to claim 7, comprising:
picking a biggest value $l_k$ of the values $l_1, l_2, \ldots l_n$;
reducing the value $l_k$ by 1;
determining for the value $l_k$ if inequality is violated (i.e., if $\Sigma_{i=1}^{n}(\frac{1}{2})^{l_i} > 1$), wherein for a case the inequality is violated then increase $l_k$ by 1, else compute a value l for $l_k$.

10. The method according to claim 9, comprising using binary tree pruning to assign codewords code $(x_i)$ such that length(code $x_i$))=$l_i$.

11. The method according to claim 1, comprising sending, by the network device, a message comprising the assigned prefix code to the publish-subscribe system to subscribe to the at least one category of the publish-subscribe system.

12. The method according to claim 1, wherein the network device comprises one of a user equipment and a base station.

13. The method according to claim 1 performed with at least one non-transitory memory embodying computer program code, the computer program code executed by at least one processor.

14. An apparatus comprising:
at least one processor; and
at least one memory including computer program code, where the at least one memory and the computer program code are configured, with the at least one processor, to cause the apparatus to at least:
receive a category tree comprising a plurality of categories, each category having a level, wherein the category tree corresponds to a publish-subscribe system having a length requirement of a prefix code system, the length requirement being a number of bits reserved by the publish-subscribe system for an indication of a category;
determine a first level category code length of each first level category of a first level of the category tree such that the length requirement of the prefix code system for the first level is not exceeded based on a number of categories of the plurality of categories that are sub-categories of the first level category, wherein a first first level category and a second first level category have first level category code lengths that are different;
assign a first prefix code of the corresponding first level category code length to each category of the first level, wherein each subscription of the publish-subscribe system being stored in association with at least one first prefix code, the at least one first prefix code enabling category matching at the first level;
determine for each category of the first level of the category tree, a second level shortest code length for one or more second categories of the plurality of categories that correspond to a second level of the category tree and that are sub-categories of the category of the first level, the second level shortest code length being determined (a) based on a number of the one or more second categories that are sub-categories of the category of the first level and (b) such that the length requirement of the prefix code system for the second categories is not exceeded, wherein a first second level category that is a sub-category of the first first level category and a second second level category that is a sub-category of the second first level category have second level shortest code lengths that are different thereby reducing the number of bits required to provide a prefix code that enables prefix matching at an arbitrary level of the hierarchy;
assign a second prefix code of the second level shortest code length to at least the second category; and
match at least one publication to at least one subscription based on at least one first prefix code and optionally a second prefix code associated with the at least publication and one or more first prefix codes and optionally one or more corresponding second prefix codes associated with the at least one subscription, wherein the at least one publication is provided in accordance with the matched at least one subscription via a transmission having the number of bits corresponding to the length requirement reserved for indication of a category corresponding to the at least one publication and the matched at least one subscription.

15. The apparatus according to claim 14, wherein the determining the first level shortest code length of a category is taking into account the second category.

16. The apparatus according to claim 15, wherein a number of categories that are subcategories of the first category is known priori by the apparatus.

17. The apparatus according to claim 15, wherein the determining comprises identifying code bits of a code length of at least one of the first category and the one or more second categories that are not necessary for prefix matching and removing the bits from the code length.

18. The apparatus according to claim 17, wherein the determining comprises applying a minimum code assignment for category hierarchy algorithm first to bits of the second category and then the first category to determine a shortest code length of the category tree, the shortest code length of the category tree being at least the sum of the first level shortest code length and the second level shortest code length.

19. The apparatus according to claim 18, wherein the determining takes as input a list (DDL($x_1$), DDL($x_2$), ..., DDL($x_n$)), wherein $x_1, x_2, \ldots, x_n$ are the one or more second categories of the first category, and wherein DDL(x) indicates how many bits are needed to code all the second categories.

20. The apparatus according to claim 19, wherein the at least one memory including the computer program code is configured with the at least one processor to cause the apparatus to:
determine a number of the second categories;
for a case where the number of second categories equals 1 then let code $(x_1)=0$,
else for a case where the number of second categories is greater than 1 then compute a value l for each of the second categories, where l is an integer.

21. The apparatus according to claim 20, where computing the value l for each of the second categories comprises computing:

For each $1 \leq i \leq n$, let $$l_i = \lceil \log_2(\Sigma_{j=1}^{n} 2^{m_j}) \rceil - m_i$$

22. The apparatus according to claim 20, wherein the at least one memory including the computer program code is configured with the at least one processor to cause the apparatus to:

pick a biggest value $l_k$ of the values $l_1, l_2, \ldots l_n$
reduce the value $l_k$ by 1;
determine for the value $l_k$ if inequality is violated (i.e., if $\Sigma_{i=1}^{n}(\frac{1}{2})^{l_i} > 1$), wherein for a case the inequality is violated then increase $l_k$ by 1, else compute a value l for $l_k$.

23. The apparatus according to claim 22, wherein the at least one memory including the computer program code is configured with the at least one processor to cause the apparatus to:

use binary tree pruning to assign codewords code $(x_i)$ such that $\text{length}(\text{code}(x_i)) = l_i$.

24. The apparatus according to claim 14, wherein the at least one memory including the computer program code is configured with the at least one processor to cause the apparatus to send a message comprising the assigned prefix code to the publish-subscribe system to subscribe to the at least one category of the publish-subscribe system.

25. The apparatus according to claim 14, wherein the apparatus comprises one of a user equipment and a base station.

\* \* \* \* \*